United States Patent
Small et al.

(10) Patent No.: US 7,093,788 B2
(45) Date of Patent: Aug. 22, 2006

(54) ROTATING FLYING WING AIRCRAFT AND CONTROL SYSTEM

(75) Inventors: James G. Small, Tucson, AZ (US); Donald J. Lacey, Tuscon, AZ (US); Lloyd E. Kinsey, Jr., Tucson, AZ (US); Mark V. Zepeda, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 62 days.

(21) Appl. No.: 10/891,588

(22) Filed: Jul. 15, 2004

(65) Prior Publication Data

US 2006/0011778 A1    Jan. 19, 2006

(51) Int. Cl.
B64C 27/16    (2006.01)

(52) U.S. Cl. .............. 244/12.2; 244/17.11; 416/24; 416/99

(58) Field of Classification Search ........ 244/7 R–7 C, 244/17.11, 6, 39, 12.2, 23 C; 416/24–26, 416/99
See application file for complete search history.

(56) References Cited

U.S. PATENT DOCUMENTS

| | | | | | |
|---|---|---|---|---|---|
| 1,230,443 | A | * | 6/1917 | Tarbox | 244/6 |
| 1,374,487 | A | * | 4/1921 | Brown | 244/7 A |
| 1,519,866 | A | * | 12/1924 | Marchetti | 416/99 |
| 1,545,198 | A | * | 7/1925 | Rietti | 244/7 A |
| 1,550,106 | A | * | 8/1925 | Shaw | 244/7 A |
| 1,754,910 | A | * | 4/1930 | Serna | 244/7 A |
| 1,817,074 | A | * | 8/1931 | Glessner | 244/7 A |
| 2,364,496 | A | * | 12/1944 | Vogel | 416/24 |
| 2,418,274 | A | * | 4/1947 | Nemeth | 416/24 |
| 2,953,321 | A |   | 9/1960 | Robertson et al. | |
| 3,166,129 | A | * | 1/1965 | Bryan | 416/24 |
| 4,482,110 | A | * | 11/1984 | Crimmins, Jr. | 244/26 |

* cited by examiner

*Primary Examiner*—Galen Barefoot
(74) *Attorney, Agent, or Firm*—Renner, Otto, Boisselle & Sklar, LLP (57) ABSTRACT

A rotating wing aircraft has a rotating fuselage and wings. The aircraft is configured to rotate with the air passing over the wings because of the rotation providing the lift needed to keep the aircraft aloft. The wings have rudders coupled to them, such as at the tips of the wings, to provide force for laterally moving the aircraft. The aircraft may be able to remain airborne by hovering for a long period of time, on the order of days. Power for the aircraft may be provided by a central diesel electric generator, which provides power for electric motors that turn propellers that are on the wings. The aircraft may be used for any of a variety of applications, such as for surveillance, communications, or as a radar platform.

49 Claims, 6 Drawing Sheets

ROTATING FLYING WING AIRCRAFT AND CONTROL SYSTEM

BACKGROUND OF THE INVENTION

1. Technical Field

The invention relates to aircraft capable of hovering, and capable of long-duration flight on the order of days.

2. Background of the Related Art

Previous aircraft designs have generally been optimized for relatively rapid transport of cargo from one point to another, or over an intervening region. Such aircraft, which have generally included an onboard crew, have not been suitable for long-duration missions, such as missions taking multiple days.

Air ships tend to be expensive to operate, and tend to be more fragile than many other types of aircraft, such as fixed wing aircraft. Also, air ships may be difficult to handle, especially in high winds. Further, air ships tend to be relatively slow compared with other types of aircraft.

Helicopters are one type of aircraft that is capable of hovering during flight. However, helicopters are highly stressed machines which require extensive maintenance. In addition, helicopters have poor fuel efficiency, which limits their flight time to less than that of fixed wing conventional aircraft. In addition, helicopters tend to have poor high altitude performance, when compared with other types of aircraft.

None of the prior types of aircraft described above are suitable for long-duration missions at high altitudes, especially where the missions may involve staying in substantially the same location for long periods of time.

SUMMARY OF THE INVENTION

According to an aspect of the invention, a rotating aircraft has a central fuselage, at least two substantially fixed wings coupled to the fuselage, and a propulsion system to rotate the wings and the fuselage. The aircraft may have a wingspan of at least 6 meters. The propulsion system may have propellers that are coupled to the wings. The propellers may be turned by individual engines. Alternatively, the propellers may be turned by electric motors, which in turn are powered by a generator, which may be located in the fuselage. The wings may have rudders at their distal ends to move the aircraft laterally, and to maintain position of the aircraft in crosswinds. The rudders may be freely hinged in their coupling to the wings. The center of mass of the fuselage may be above the wings. The aircraft may have a de-spun section, which may spin at a different rate than the rest of the aircraft, or which may not spin at all. The aircraft may have a majority of its weight taken up by fuel at take off, and may be able to stay aloft for several days, such as for at least five days. The aircraft may be used for any of a variety of purposes, such as a radar platform, for surveillance, or for communication.

According to another aspect of the invention, an aircraft includes: a central rotating fuselage; at least two wings attached to the central fuselage; and a propulsion system configured to rotate the platform and the wings substantially within a plane defined by the wings, thereby enabling the wings to generate lift. The aircraft has a wingspan of at least about 6 meters long.

According to yet another aspect of the invention, an aircraft includes: a central rotating fuselage; at least two wings attached to the central fuselage; and a propulsion system configured to rotate the platform and the wings substantially within a plane defined by the wings, thereby enabling the wings to generate lift. The propulsion system includes propellers coupled to the wings to rotate the aircraft. The propellers are mounted inboard of distal tips of the wings, such that the propellers encounter an effective airspeed less than an effective airspeed encountered at the distal tips of the wings.

According to still another aspect of the invention, an aircraft includes: a central rotating fuselage; at least two wings attached to the central fuselage; and a propulsion system configured to rotate the platform and the wings substantially within a plane defined by the wings, thereby enabling the wings to generate lift. The propulsion system includes: propellers coupled to the wings to rotate the aircraft; electric motors coupled to respective of the propellers; and at least one generator coupled to the motors, to provide power to the motors.

According to a further aspect of the invention, an aircraft includes: a central rotating fuselage; at least two wings attached to the central fuselage; and a propulsion system configured to rotate the platform and the wings substantially within a plane defined by the wings, thereby enabling the wings to generate lift. A center of mass of the fuselage is located above the wings.

According to a still further aspect of the invention, an aircraft includes: a central rotating fuselage; at least two wings attached to the central fuselage; rudders mechanically coupled to the wings to exert a lateral force on the aircraft; a propulsion system configured to rotate the platform and the wings substantially within a plane defined by the wings, thereby enabling the wings to generate lift; and a control system coupled to the rudders to cyclically position the rudders.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale.

DETAILED DESCRIPTION

A rotating wing aircraft has a rotating fuselage and wings. The aircraft is configured to rotate with the air passing over the wings because of the rotation providing the lift needed to keep the aircraft aloft. The wings have rudders coupled to them, such as at the tips of the wings, to provide force for laterally moving the aircraft. The aircraft may be able to remain airborne by hovering for a long period of time, on the order of days. Power for the aircraft may be provided by a central diesel electric generator, which provides power for electric motors that turn propellers that are on the wings. The aircraft may be used for any of a variety of applications, such as for surveillance, communications, or as a radar platform.

Figure 1:
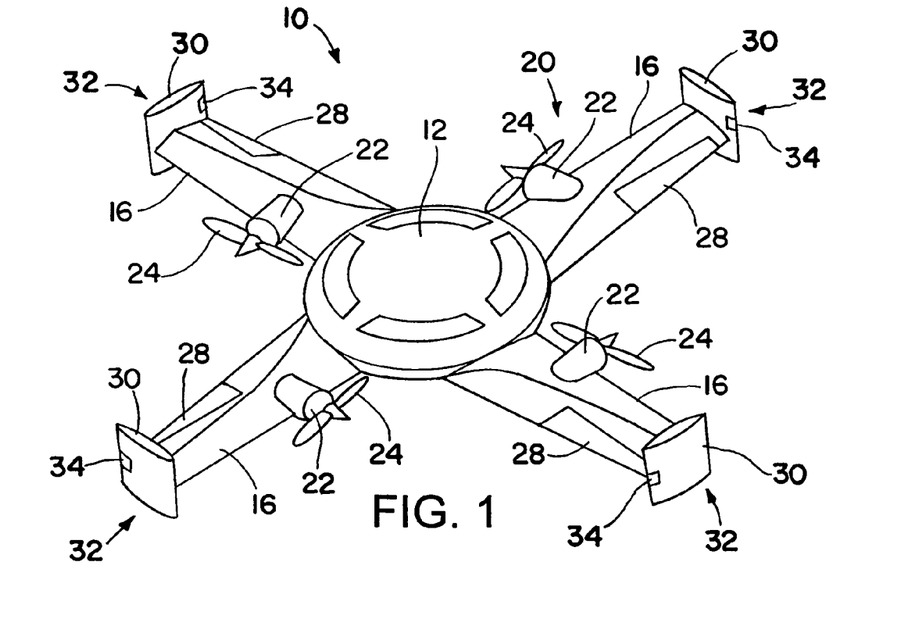
FIG. 1 is an oblique view of an aircraft in accordance with the present invention.

Referring initially to FIG. 1, an aircraft 10 includes a rotating fuselage 12 that has fixed wings 16 attached to it. As the aircraft 10 rotates, the wings 16 generate lift to maintain the aircraft 10 in the air. The aircraft 10 has a propulsion system 20 to provide power to keep the aircraft 10 rotating. As shown in FIG. 1, the propulsion 20 may include engines 22 coupled to each of the wings 16. The engines 22 are used to turn propellers 24. The engines 22 and the propellers 24 may be configured so that the thrust provided by the propulsion system 20 is all in one rotational direction, such as the counter-clockwise direction illustrated in FIG. 1.

The aircraft 10 shown in FIG. 1 has four wings 16, each with an engine and propeller. It will be appreciated that a wide variety of other configurations are possible. For example, a greater or lesser number of the wings 16 may be employed. The aircraft 10 may have two, three, or four or more of the wings 16. The wings 16 may be configured to be evenly spaced about the fuselage 12. Thus, for an even number of the wings 16, there may be pairs of wings which are diametrically opposed to one another. It will be appreciated that it may be possible to configure the aircraft 10 so that only some of the wings 16 have engines 22 and propellers 24. For example, the aircraft 10 may have four wings, only two of which have propulsion devices.

The wings 16 each have ailerons 28 for providing control of the aircraft 10. The ailerons 28 may be used to maintain the aircraft 10 in a desired orientation, such as substantially parallel to the ground.

The aircraft 10 has rudders 30 at distal ends 32 of the wings 16, away from the fuselage 12. The rudders 30 are used to provide lateral forces to move the aircraft laterally. The rudders 30 may be hingedly coupled to the distal ends 32 of the wings 16, such that the rudders 30 may freely attain an alignment to whatever local airflow they are encountering. In order to deflect the rudders 30 relative to the local airflow, the rudders 30 are provided with trim tabs 34 at their trailing edges. The trim tabs are coupled to suitable actuators, such as suitable servo actuators, in order to adjust movement of the trim tabs 34. By adjusting movement of the trim tabs 34, the rudders 30 may be positioned in a desired direction relative to the local airflow. This allows the rudders 30 to generate a force in a direction roughly perpendicular to the rudders 30. The aircraft 10 may thus be able to engage in lateral movement. It will be appreciated that the rudders 30 may be adjusted cyclically during rotation of the aircraft 10 to achieve a desired movement of the aircraft 10.

The aircraft 10 may have any of a wide variety of suitable sizes. The wingspan of the wings 16 may be at least about 6 meters (20 feet). Since the wings 16 become more efficient as their length increases, a longer wingspan may be utilized. Thus, the wingspan may be at least about 30 meters (100 feet), or even as much as about 60 meters (200 feet) or more. As an example, the aircraft 10 may have a wingspan of about 30 feet in diameter, and may rotate once about every two seconds. With this size and rotation rate, the airspeed at the rudders 30 may be about 160 kilometers per hour (100 miles per hour). This would allow the rudders 30 to produce very powerful side forces with only a minor deflection. Thus the rudders 30, properly controlled, may produce significant lateral speed for the aircraft 10. With the example figures given above, the aircraft 10 may be capable of obtaining speeds of over 200 kilometers an hour. It will be appreciated that the figures given above are only examples and that other sizes and/or rotation rates of the aircraft 10 may be utilized.

Figure 2:
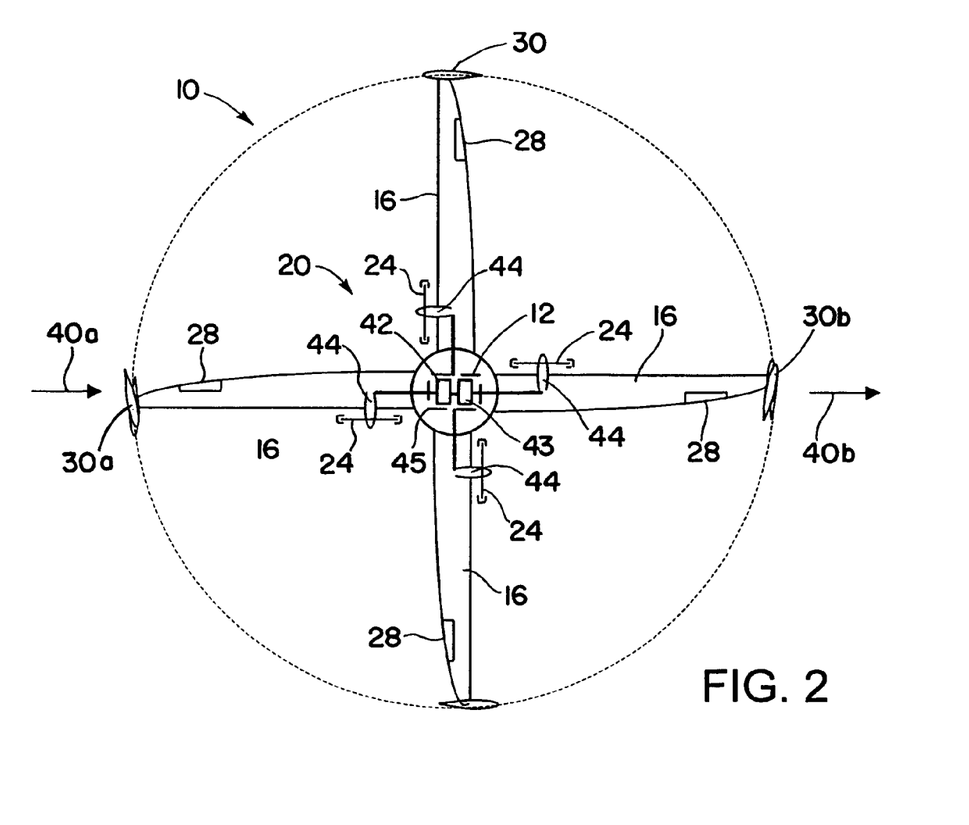
FIG. 2 is a plan view showing details of an aircraft in accordance with the present invention.

FIG. 2 shows an example of deflection of the rudders 30 in order to provide an aerodynamic force in a lateral direction. As shown in FIG. 2, the rudders 30a and 30b on opposite sides of the aircraft 10 may be deflected in opposite directions. This produces aerodynamic forces 40a and 40b in the same lateral direction. These aerodynamic forces 40a and 40b are produced by the deflected rudders 30a and 30b in a manner similar to tacking on a sailboat, or movement of a lift-producing wing through an airflow.

Also illustrated in FIG. 2, the fuselage 12 may contain a generator 42 that is part of the propulsion system 20. The generator 42 is driven by an engine 43, to generate electric power to drive electric motors 44. The generator 42 provides the electricity to the motors 44, allowing the motors 44 to turn respective propellers 24 that are mechanically coupled to the motors 44. This is an alternative configuration of the propulsion system 20, with the generator 42 and the motors 44 taking the place of the engines 22 (FIG. 1).

The use of the generator 42 and the electric motors 44 may provide several advantages in the context of a long-duration flight aircraft, such as the aircraft 10. For one thing, the generator 42 may be more reliable than corresponding aircraft internal combustion engines. Another advantage is that the generator 42 may be centrally located within the fuselage 12.

Use of the generator 42 in the aircraft 10 may also allow for greater interchangeability of parts within systems. The generator 42 may be similar to or identical to generators used in other types of vehicles, such as turbine engines used in vehicles such as tanks, trucks, or other transport vehicles.

The generator 42 and the engine 43 may be parts of a combined generator-engine 45, such as any of a variety of suitable diesel electric generators. It will be appreciated that it may be necessary to supercharge or turbocharge the engine 43 in order to produce sufficient airflow. The generator-engine 45 may use any of a variety of "heavy" fuels, such as diesel fuel, Jet-A, or JP4, for instance.

It will be expected that there will be a weight penalty in utilizing the generator-engine 45 and the motors 44, instead of the engines 22 (FIG. 1). However, the additional weight involved may be of secondary importance in configuring a long-duration flight aircraft such as the aircraft 10. It will be expected that a majority of the take-off weight of the aircraft 10 will be taken up by the fuel carried onboard. For example, 60% of the aircraft 10 may be taken up by its fuel supply. In this context, the additional weight of the generator-engine 45 and the motors 44 may be of lesser importance than the advantages described above for such a propulsion system.

In the propulsion system 20 shown in FIG. 2, the generator-engine 45 may be run at a constant speed with automatic throttle adjustments to compensate for changing load requirements. The use of the single generator-engine 45 with the electric motors 44 may avoid difficulties inherent in trying to synchronize four separate internal combustion engines, such as the engines 22 shown in FIG. 1. In addition to providing power to supply the motors 44, the generator-engine 45 may also be used to provide energy to run control systems, radar systems, communications systems, etc. Full engine power of the generator-engine 45 may be typically used for take off and climb. Once the aircraft is at a final hover altitude, however, power requirements for the motors 44 are reduced. The excess electric power then made available may be used for other systems of the aircraft 10.

To illustrate the relative unimportance of the additional weight of the generator-engine 45, it is estimated that for long dwell missions, such as missions of five to seven days, the majority of the take-off weight of the aircraft 10 may be in the weight of the fuel. Thus there may be approximately 9,000 Kilograms (20,000 pounds) of fuel onboard the aircraft 10 during take-off. In view of this large weight of fuel, there is little difference whether the propulsion system 20 weighs 230 Kilograms (500 pounds) or 360 Kilograms (800 pounds). This is different from the situation in a conventional small aircraft, where the engine weight may be comparable to the total fuel weight. In a large hovering aircraft such as the aircraft 10, there is no comparable driving requirement to reduce engine weight to its smallest possible amount. This allows use of very strong and reliable engines 43, such as diesel engines used in long haul trucking or marine applications. Supercharging or turbocharging systems may be used to modify such engines for high altitude, to assure adequate air induction.

Figure 3:
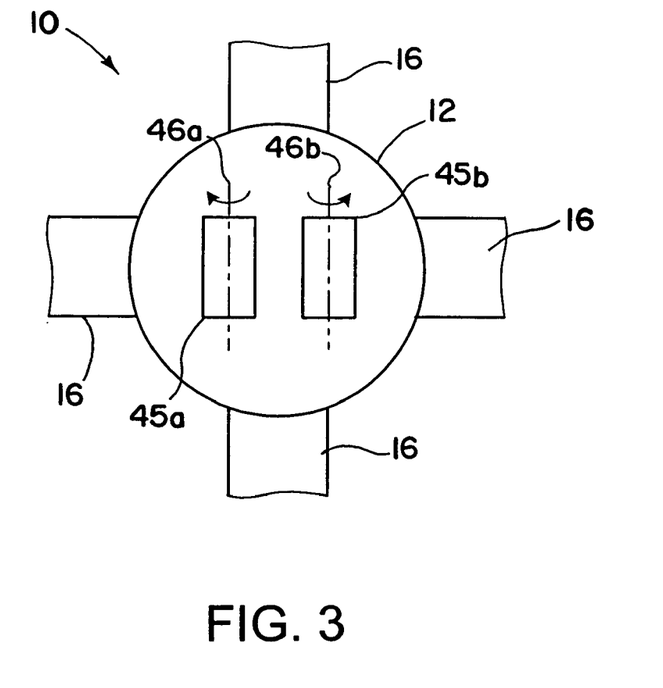
FIG. 3 is a plan view of an aircraft in accordance with the present invention, showing possible orientations of a pair of engine-generators.

With use of rotating machinery on a rotating platform, such as the use of the generator 42 on the rotating frame 12, attention must be made to gyroscopic forces. If the engine 43 and the generator 42 are mounted horizontally, the gyroscopic forces will try to precess the power train at right angles to the drive shaft rotation axis. The result is a tilting force on the airframe that must be compensated for by deflection of the ailerons 28. This constant use of the ailerons 28 would not be an efficient use of the wings 16. However, gyroscopic precession may be avoided in at least two ways. One is to use two engine generator systems side by side, but pointing in opposite directions. Such a mounting is illustrated in FIG. 3, with generator-engine combinations 45a and 45b that have respective axes 46a and 46b that are in substantially opposite directions. This allows the precession forces to cancel out. A second method is to mount the engine 43 and the generator 42 with their rotating shafts in a vertical direction, in which case there are not precessional forces generated due to rotation of the aircraft 10.

Figure 4:
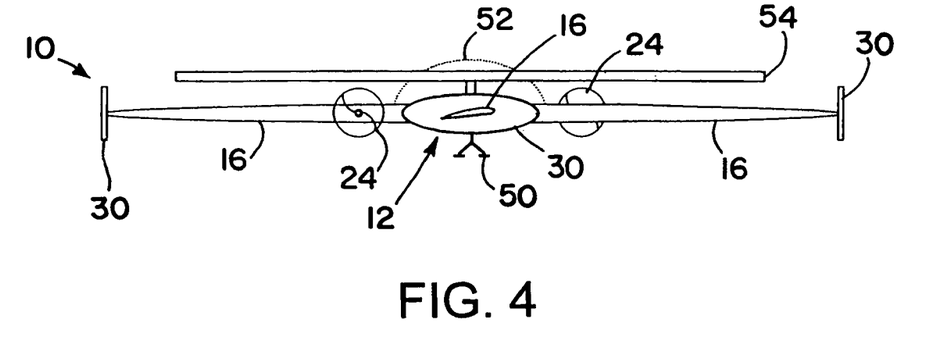
FIG. 4 is a side view of an aircraft in accordance with the present invention, showing possible radar dome (radome) configurations.

FIG. 4 shows further details of possible configurations of the aircraft 10. Landing gear 50 may be mounted to an underside of the fuselage 12. The landing gear 50 may be any of a variety of suitable supports for preventing damage to the aircraft 10 during takeoff and landing. The landing gear 50 may include pads, wheels, or spikes, in suitable arrangements.

FIG. 4 also shows a pair of possible radar dome (radome) configurations 52 and 54, for a radar system that is coupled to the fuselage 12. The radar domes 52 and 54 may be coupled to suitable other components of a radar system. As shown in FIG. 4, the radomes 52 or 54 may be located above the wings 16. The radomes 52 and 54 may be configured to remain stationary, or to rotate at a different speed than the rest of the aircraft 10. Mechanisms for maintaining a stationary or different-rotation-rate part of the aircraft 10 are discussed further below.

It will be appreciated that other equipment may be housed in the fuselage 12. Such additional equipment may include control systems for controlling position, attitude and/or altitude of the aircraft 10. In addition, a wide variety of payloads may be included as part of the aircraft 10. One of those payloads, a radar system, was discussed in the previous paragraph. Other examples of payloads that may be part of the aircraft 10 include sensor systems, photographic systems, and weapons systems. It will be appreciated that it may be desirable to maintain aloft any of a wide variety of suitable payloads.

It will be further appreciated that the aircraft 10 described above provides several advantages when compared with prior art systems such as conventional aircraft and helicopters. The aircraft 10 may have a very efficient design, in that it may be able to employ very long aspect ratio wings, resembling glider wings, in conditions where the speed of air passing over the wings makes for a highly efficient load drag environment. As described, the wing tip speed may be about 160 kilometers an hour.

The propulsion system 20 of the aircraft 10 provides rotation through use of symmetrically placed low-speed propellers 24. The net result is a zero torque propulsion system. Unlike helicopters, no mechanism for balancing torque, such as tail rotors or counter-rotating airfoils, need be employed.

In addition, the placement of the propellers 24 inboard on the wing 16 allows the propellers 24 to operate in low-speed airflows. This placement allows the use of highly efficient low-speed propellers. This advantage is not attainable in conventional fixed-wing aircraft, since propellers in such aircraft face substantially the same apparent air speed regardless of their locations on the wings or fuselage of the conventional aircraft.

Further, the fuselage 12 is placed at the center of the aircraft 10. In stationary, hovering flight, this is the position in the aircraft 10 that faces the lowest speed airflow over all surfaces.

Unlike a conventional helicopter, the aircraft 10 uses no cyclic control. In flight the rotation of the wings 16 hold the aircraft substantially horizontal and parallel to the ground. This orientation may be maintained by suitable, possibly cyclic, actuation of the ailerons 28.

The aircraft 10 may be made inherently stable by placement of its center of gravity above the level of the wings 16. Thus, placement of a radar dome, such as the domes 52 or 54, may increase stability of the aircraft 10. In addition, it will be appreciated that by locating the radome 52 or 54 above the wings 16, the radome 52 or 54 is advantageously moved out of the downwash from the wings 16.

As described earlier, lateral force to move the aircraft 10 laterally, or to maintain the aircraft 10 in place against crosswinds, may be accomplished by suitable cyclic positioning of the rudders 30. To provide thrust in a single direction it is necessary to periodically deflect the rudders 30 as the wings 16 move about in a circle. For an aircraft with 4 wings, the even-numbered rudders must deflect in phase quadrature with respect to the odd-numbered rudders. A control system, described further below, provides for synchronized periodic rudder deflection with adjustable amplitude. Appropriate deflections of the rudders 30 may be used to have the aircraft 10 hover over a stationary point in the presence of cross winds, or to provide forward air speed for cross-country flight of the aircraft 10.

Figure 5:
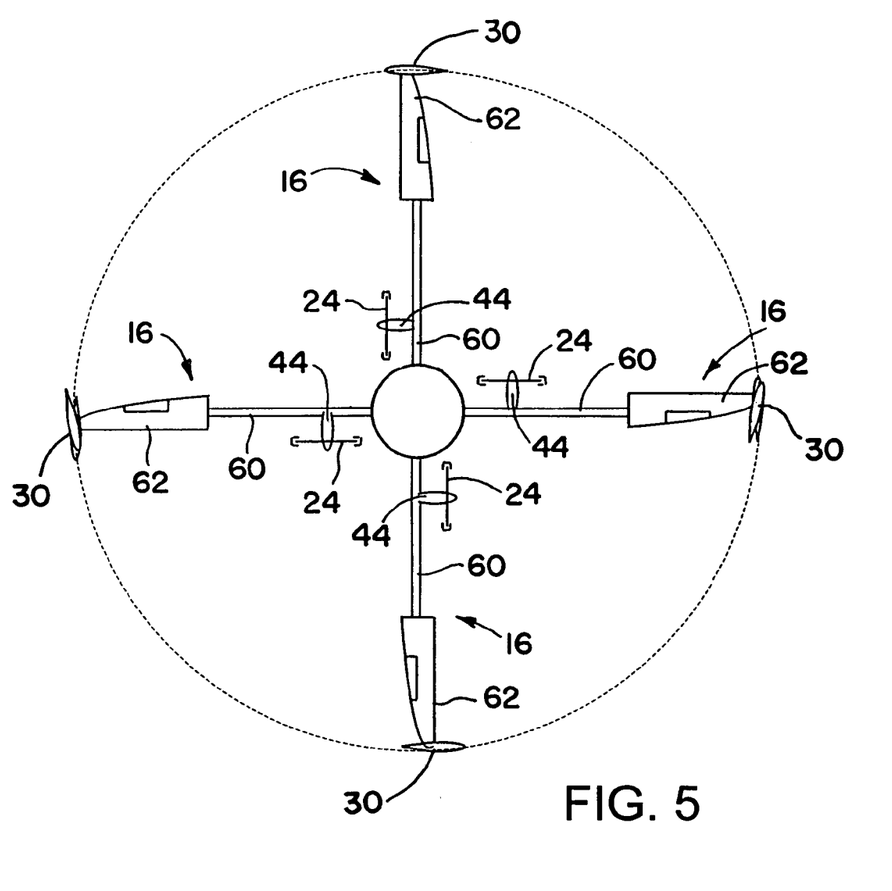
FIG. 5 is a plan view of another embodiment of an aircraft in accordance with the present invention.

FIG. 5 shows an alternative configuration of the aircraft 10. It will be appreciated that in rotating the aircraft 10 it is the distal portions of the wings 16 which encounter the high apparent air speed. These distal portions of the wings 16 are the portions that are predominantly responsible for providing lift for the aircraft 10. In the configuration shown in FIG. 5 inboard portions of the wings 16 are omitted, such that the wings 16 obtain a new configuration. In this configuration, the wings 16 have inboard supports 60 that support outboard, lift-producing regions 62. Inboard supports 60 are not configured to produce appreciable lift, and are present only to support the engines 22 or motors 44, that are used to drive the propellers 24, and to provide support for the lift-producing region 62. Thus, less material may be used in the inboard portions of the wings 16. Thus the wings 16 are made lighter in their inboard portions, where relatively less lift is produced. This allows reduction of weight of the wings 16, and/or increasing the span of the wings 16, in comparison with designs where all portions of the wings 16 are lift-producing portions.

Less than half of the length of the wing 16 may be taken up by the lift-producing regions 62. Alternatively, even less of the length of the wings may be taken up by the lift-producing regions 62. For example, studies have shown that 60% of the lift of a full lift-producing wing 16 may occur in the outboardmost 20% of the wing. Therefore, the outboard lift-producing region 62 of the wing 16 may be about 1/3 or less of the overall length of the wings 16.

The outboard lift-producing regions 62 may be coupled to the supports 60 such that the outboard regions 62 are free to rotate relative to the inboard supports 60. This allows the lift-producing region 62 of the wing 16 to automatically find an orientation that results in minimal drag. Alternatively, the outboard regions 62 may be fixedly attached to the supports 60.

The concept of allowing all or part of the wing 16 to freely rotate may be extended to other locations and configurations of the wing 16. As an alternative to the free rotation between the portions 60 and 62 of the wing, the entire wing 16 (either a fully lift-producing wing or a partially lift-producing wing) may be free to rotate relative to the fuselage 12. However, it will be appreciated that the configuration described above, with the outboard portion 62 free to rotate relative to the inboard support 60, allows the wings 16 to obtain a low-drag configuration, without changing the relative orientation of the propeller 24.

The inboard support 62 may have a streamlined shape, in order to reduce drag. However, the shape of the support 62 may not necessarily be lift producing.

The wings 16 may include trim tabs to aid in positioning the wings 16, or lift-producing portions of the wings 16 relative to an airflow direction. Having all or part of the wings 16 free to rotate advantageously prevents stalling in the event there is some problem with the propulsion system 20 when the aircraft 10 is rotating at altitude. In such a situation, the wings 16 would maintain some angle of attack relative to the perceived airflow direction. This would allow the aircraft 10 to stably spiral down, rather than stalling during flight.

Another advantage to the wing configuration shown in FIG. 4 is that there is little downwash produced by the inboard supports 60, so that the air around the frame 12 may be relatively quiescent.

Figure 6:
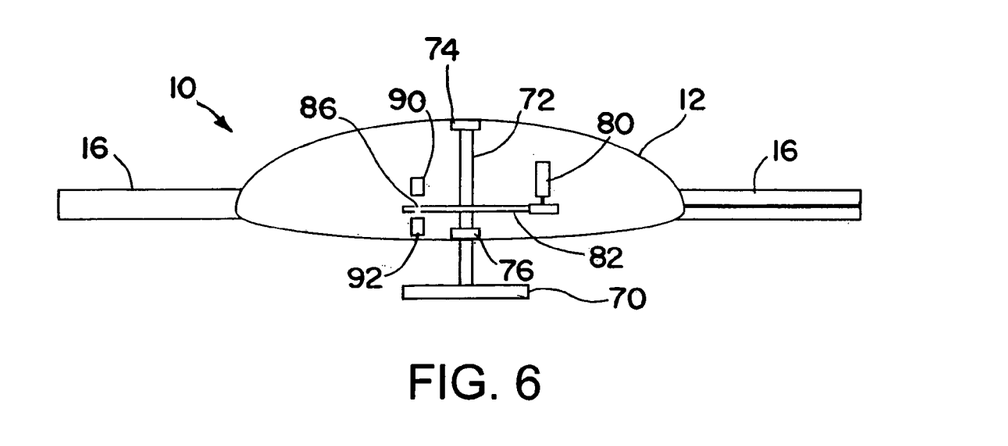
FIG. 6 is a side cutaway view illustrating a stationary platform, and components for maintaining the stationary platform in a desired orientation, all as part of an aircraft of the present invention.

Turning now to FIG. 6, the aircraft 10 may have a platform or section 70 that may rotate relative to the fuselage 12, for example to remain stationary relative to the ground. The platform 70 may be attached to a shaft 72 that is mounted to the fuselage 12 by bearing blocks 74 and 76. This allows the shaft 72 and the platform 70 to be free to rotate relative to the fuselage 12. Rotation may be accomplished by use of a de-spin motor 80 that interacts and rotates a disk 82 that is coupled to the shaft 72. The disk 82 may have a timing hole 86 therein which is used to properly control the de-spin motor 80, so as to put the platform 70 in a fixed position, for example, being in a fixed orientation with regard to magnetic north. A LED 90 and a photodetector 92 are used to determine the position of the timing hole 86, by passing light from the LED 90 to the photodetector 92 when the timing hole 86 is aligned with the LED 90 and the photodetector 92.

Figure 7:
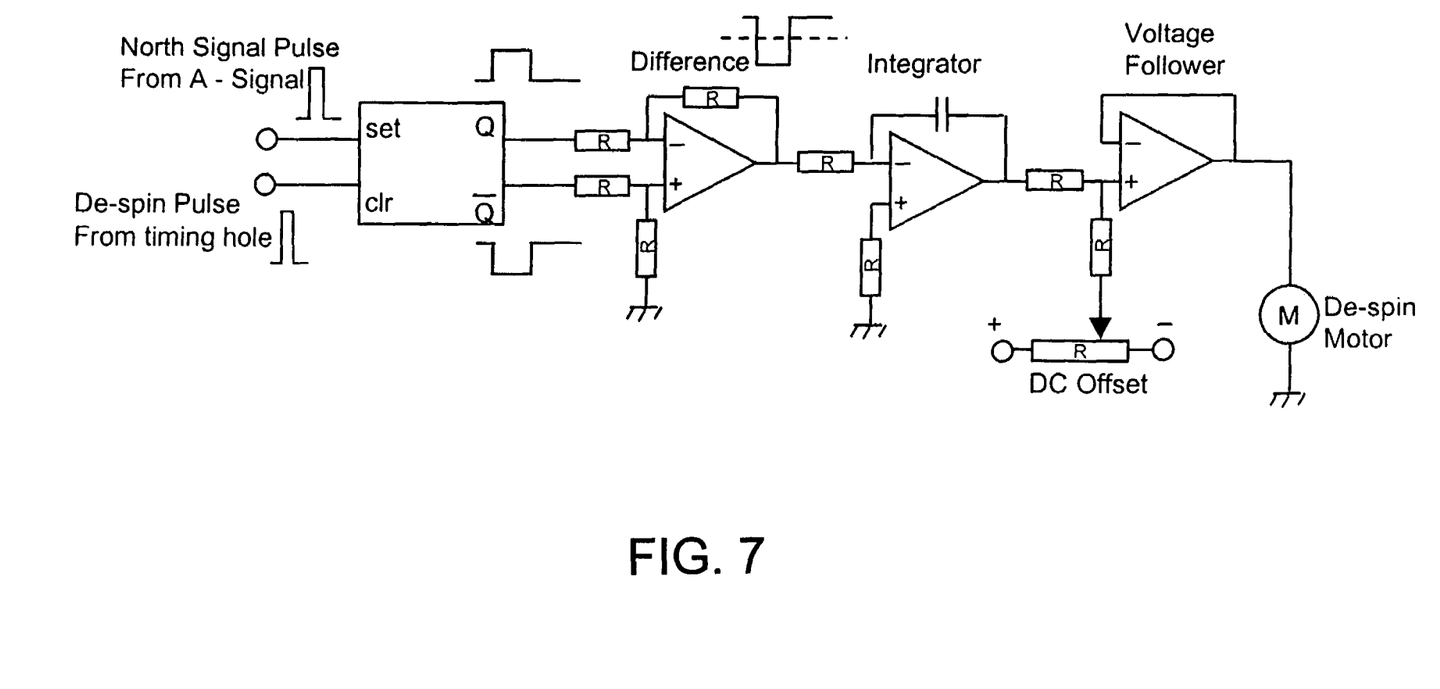
FIG. 7 is a circuit diagram showing one possible control circuit for a motor for maintaining the stationary platform in a desired location.

FIG. 7 shows a control circuit 96 for properly controlling the de-spin motor 80 to maintain the platform 70 in a desired orientation. The circuit 96 uses a signal pulse from a compass that is aboard the rotating frame 12, as well as a de-spin pulse signal from the photodetector 92, in order to provide an appropriate voltage to the de-spin motor 80. With use of the control circuit 96, the de-spin motor 80 has a speed that stabilizes when the rectangular wave signal has 50% duty cycle, that is, when the timing hole 86 of the disk 82 is stationary with regard to a given direction, or at a desired rotation rate either relative to the ground, or relative to the rest of the aircraft 10.

Figure 8:
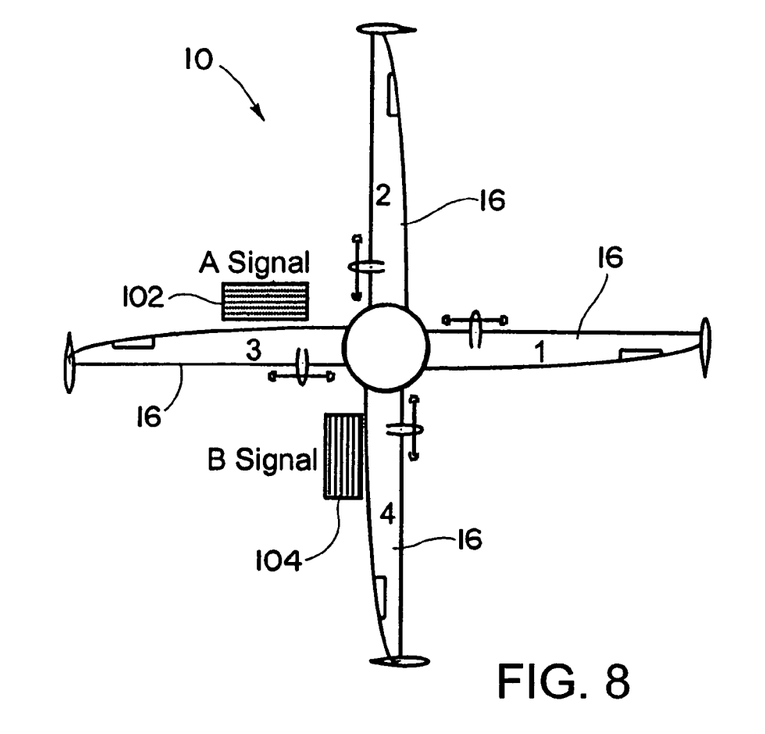
FIG. 8 is a plan view illustrating orientation of magnetic induction coils in an aircraft of the present invention, for controlling rudders of the aircraft.
Figure 9:
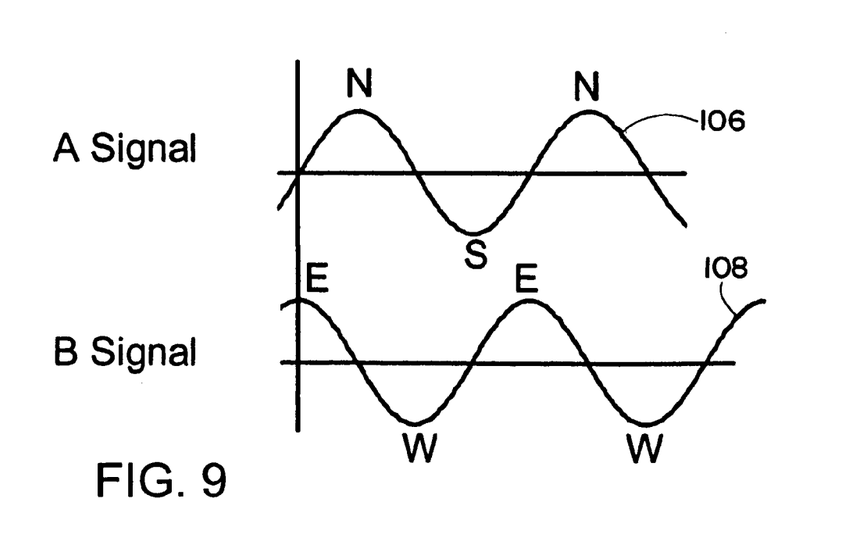
FIG. 9 is a graph of signals from the magnetic induction coils shown in FIG. 8.
Figure 10:
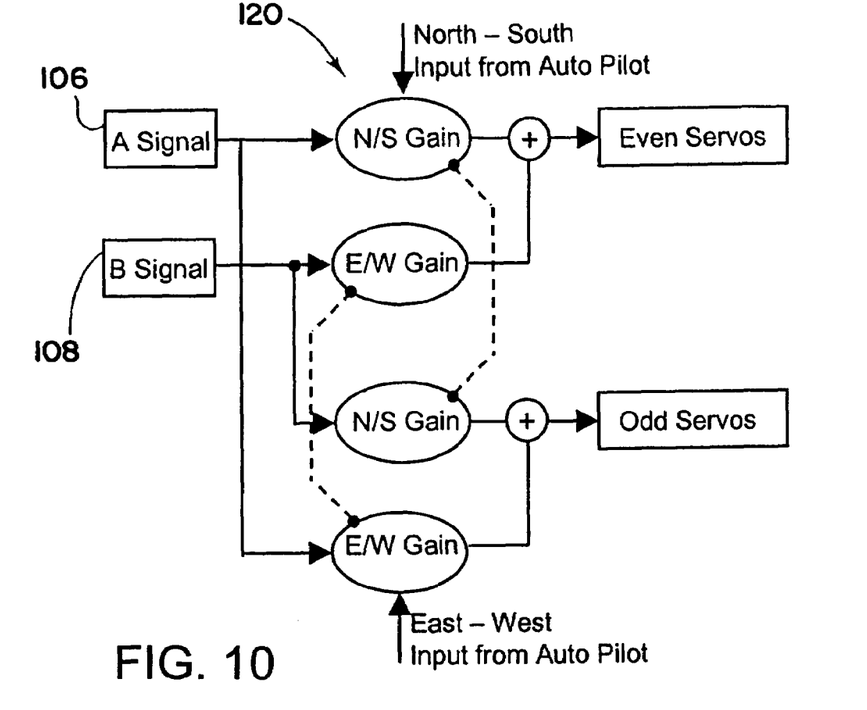
FIG. 10 is a block diagram illustrating control logic of a control system utilizing signals from the magnetic induction coils of FIG. 8.

FIGS. 8 and 9 illustrate aspects of one possible control system 100 for controlling orientation of the rudders 30. As schematically illustrated in FIG. 8, magnetic induction coils 102 and 104 may be placed in the wings 16 or the fuselage 12, aligned perpendicularly along the direction of the wings 16. As the aircraft 10 rotates, the magnetic induction coils 102 and 104 produce respective sinusoidal signals 106 and 108, which are illustrated in FIG. 9. These sinusoidal signals 106 and 108 indicate the orientation of the aircraft 10 with respect to magnetic north. The signals 106 and 108 are the signals needed to deflect the rudders 30 in a periodic or cyclic fashion as the aircraft 10 rotates. The signal 106 represents the rudder's servo commands that must be applied to one pair of the wings 16 to provide thrust in a northerly direction. The other signal 108 represents the servo-commands needed to provide thrust of the same pair of wings in an easterly direction. It will be appreciated that the signals 106 and 108 may be appropriately weighted and mixed to provide thrust in any desired direction. FIG. 10 shows control logic 120 which may be used to combine the signals 106 and 108. The signals 106 and 108 are variously combined using north-south and east-west inputs from an autopilot.

Control of the aircraft 10 may be accomplished remotely, by sending of appropriate signals such as radio signals, to and from communication systems aboard the aircraft 10. It will be appreciated that a wide variety of control functions may be accomplished remotely, such as positioning the aircraft 10, and/or operating radar systems or other sensors aboard the aircraft 10.

Figure 11:
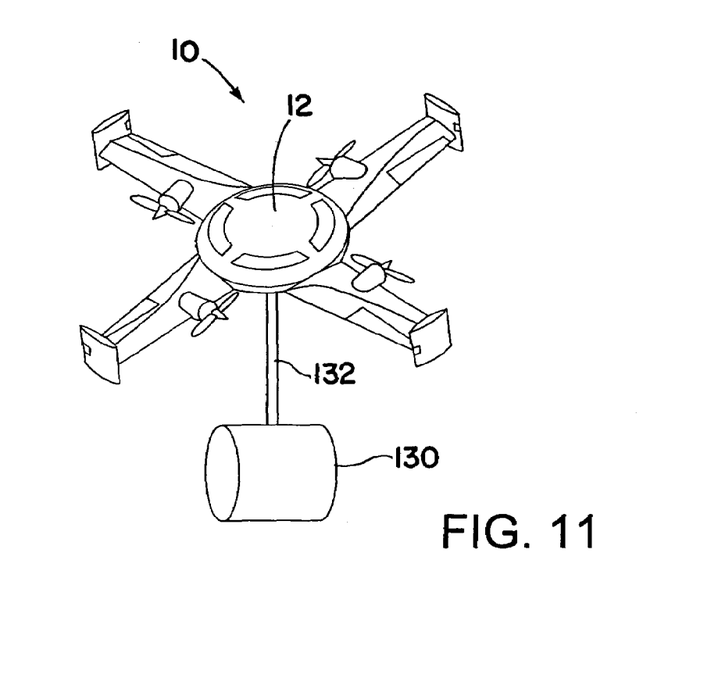
FIG. 11 is an oblique view illustrating in-flight refueling of an aircraft of the present invention.

FIG. 11 illustrates one possible way of refueling the aircraft 10 while it is in flight. The aircraft 10 may be positioned to be over a tanker 130. A hose 132 may then be dropped from the frame 12 of the aircraft 10 to the tanker 130. Fuel may be then pumped up from the tanker 130 to fuel tanks aboard the aircraft 10, allowing the aircraft 10 to refuel while in flight. The tanker 130 may be any of a variety of fuel sources including stationary land-based fuel sources, tanker ships, and/or vehicles such as tanker trucks.

It will be appreciated that aircraft such as the aircraft 10 may be used to provide a series of high-altitude long-range radar systems. At an altitude of 12,000 meters (40,000 feet) a radar system may have a horizontal range of about 640 Kilometers (400 miles). By placing relatively few such radar systems aboard stationary-flight aircraft such as those described above, radar coverage may be provided over a wide area. For example, a dozen such aircraft could provide traffic control radar coverage over the entire United States. A smaller number of such aircraft could be used to provide coverage over a coastline of the United States. Coverage of areas around the coastline could be employed for any of a number of reasons, such as to deter or intercept smuggling operations, or to monitor fishing activity in territorial waters. It will be appreciated that the aircraft 10, with its ability to hover, may be especially useful in providing air-based radar that can detect moving targets on the ground.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aircraft comprising:
   a central rotating fuselage;
   at least two high aspect ratio wings attached to the central fuselage;
   respective rudders coupled to the wings; and
   a propulsion system configured to rotate the fuselage and the wings substantially within a plane defined by the wings, thereby enabling the wings to generate lift;
   wherein the aircraft has a wingspan of at least about 6 meters;
   wherein the rudders are wing tip rudders at distal ends of the wings, away from the fuselage; and
   wherein the wing tip rudders produce force for lateral movement of the aircraft.

2. The aircraft of claim 1, wherein the aircraft has a wingspan of at least about 30 meters.

3. The aircraft of claim 1, wherein the aircraft has a wingspan of at least about 60 meters.

4. The aircraft of claim 1, wherein the at least two wings includes at least three wings.

5. The aircraft of claim 1, wherein the at least two wings includes at least four wings.

6. The aircraft of claim 1, wherein the wings are axisymmetrically located about the fuselage.

7. The aircraft of claim 1, wherein the wing tip rudders are hingedly coupled to the distal ends of the wings.

8. The aircraft of claim 1, wherein the wing tip rudders include actuatable tabs to control the angles of the rudders relative to the wings.

9. The aircraft of claim 1, further comprising a control system for cyclically positioning the rudders relative to the wings, to control lateral movement of the aircraft.

10. The aircraft of claim 1, wherein the propulsion system includes a propeller mechanically coupled to each of the wings.

11. The aircraft of claim 10, wherein the propulsion system further includes engines operatively coupled to respective of the propellers, to turn the propellers to cause rotation of the wings and the fuselage.

12. The aircraft of claim 10, wherein the propulsion system further includes respective electric motors coupled to the propellers to turn the propellers.

13. The aircraft of claim 12, wherein the propulsion system includes a generator that is operatively coupled to the electric motors.

14. The aircraft of claim 13, wherein the generator is part of a diesel electric generator.

15. The aircraft of claim 1, wherein the wings each include:
   an inboard support that is coupled to the fuselage and that is substantially not lift producing; and
   an outboard lift-producing region;
   wherein the inboard support and the outboard lift-producing region of each wing are substantially co-planar.

16. The aircraft of claim 15, wherein the outboard region is less than half of a length of the wing.

17. The aircraft of claim 15, wherein the outboard region is less than one-third of a length of the wing.

18. The aircraft of claim 15, wherein the outboard region is free to rotate relative to the inboard support substantially about an axis along a length of the wing, substantially without mechanical constraint.

19. The aircraft of claim 1, wherein the fuselage houses one or more sensors.

20. The aircraft of claim 1, further comprising a radar system coupled to the fuselage.

21. The aircraft of claim 20, wherein the radar system includes a radar dome that is located above the wings.

22. The aircraft of claim 1, wherein the fuselage includes a de-spun section that rotates at a different rate than the wings.

23. The aircraft of claim 22, wherein the de-spun section is substantially non-rotational.

24. The aircraft of claim 22, wherein the fuselage includes a de-spin motor that is mechanically coupled to the de-spun section for controlling the rotation rate of the de-spun section.

25. The aircraft of claim 1, wherein the wings each include respective ailerons.

26. The aircraft of claim 1, wherein each of the wings has a length of at least about 15 meters.

27. An aircraft comprising:
   a central rotating fuselage;
   at least two wings attached to the central fuselage;
   a propulsion system configured to rotate the fuselage and the wings substantially within a plane defined by the wings, thereby enabling the wings to generate lift;
   wherein the propulsion system includes propellers coupled to the wings to rotate the aircraft;

wherein the wings each include:
an inboard support that is coupled to the fuselage and that is substantially not lift producing; and
an outboard lift-producing region; and
wherein the inboard support and the outboard lift-producing region of each wing are substantially co-planar; and
wherein the outboard region of each wing is free to rotate relative to the inboard support, about an axis along a length of the wing, substantially without mechanical constraint.

28. The aircraft of claim 27, wherein the outboard region is less than half of a length of the wing.

29. The aircraft of claim 27, wherein the outboard region is less than one-third of a length of the wing.

30. The aircraft of claim 27, wherein the propellers are coupled to the inboard supports.

31. The aircraft of claim 27, wherein the aircraft has a wingspan of at least about 6 meters.

32. The aircraft of claim 27, wherein the aircraft has a wingspan of at least about 30 meters.

33. The aircraft of claim 27, wherein the propellers are mounted inboard of the distal tips of the wings, such that the propellers encounter an effective airspeed less than an effective airspeed encountered at the distal tips of the wings.

34. The aircraft of claim 27,
further comprising wing tip rudders at distal tips of the wings, away from the fuselage;
wherein the wing tip rudders are configured to be cyclically tilted relative to the wings as the wings are rotated, to thereby produce force for lateral movement of the aircraft.

35. The aircraft of claim 27, wherein the propellers are mounted on the inboard supports of the wings.

36. The aircraft of claim 27, wherein the propulsion system further includes engines operatively coupled to respective of the propellers, to turn the propellers to cause rotation of the wings and the fuselage.

37. The aircraft of claim 27, wherein the propulsion system further includes respective electric motors coupled to the propellers to turn the propellers.

38. The aircraft of claim 37, wherein the propulsion system includes a generator that is operatively coupled to the electric motors.

39. The aircraft of claim 38, wherein the generator is part of a diesel electric generator.

40. An aircraft comprising:
a central rotating fuselage;
at least two wings attached to the central fuselage; and
a propulsion system configured to rotate the fuselage and the wings substantially within a plane defined by the wings, thereby enabling the wings to generate lift;
wherein the propulsion system includes:
propellers coupled to the wings to rotate the aircraft;
electric motors coupled to respective of the propellers to turn the propellers; and
at least one generator coupled to the motors, to provide power to the motors.

41. The aircraft of claim 40,
wherein the electric motors are in the wings; and
wherein the at least one generator is in the central fuselage.

42. The aircraft of claim 40, wherein the at least one generator includes a pair of generators in the central fuselage.

43. The aircraft of claim 42, wherein rotation axes of the generators are oriented in substantially opposite directions.

44. The aircraft of claim 40, wherein the aircraft has a wingspan of at least about 6 meters.

45. The aircraft of claim 40, wherein the aircraft has a wingspan of at least about 30 meters.

46. An aircraft comprising:
a central rotating fuselage;
at least two wings attached to the central fuselage;
rudders mechanically coupled to the wings to exert a lateral force on the aircraft;
a propulsion system configured to rotate the fuselage and the wings substantially within a plane defined by the wings, thereby enabling the wings to generate lift; and
a control system coupled to the rudders to cyclically position the rudders;
wherein the control system includes magnetic induction coils located in the wings, to sense orientation of the wings.

47. The aircraft of claim 46, wherein the rudders are at distal ends of the wings.

48. The aircraft of claim 46, wherein the rudders are hingedly coupled to the wings.

49. The aircraft of claim 27, wherein the aircraft has a wingspan of at least about 6 meters.

* * * * *